3,532,720
Patented Oct. 6, 1970

3,532,720
HALOGENATED BICYCLIC ETHERS
Paul R. Stapp, Bartlesville, Okla., assignor to Phillips Petroleum Company, a corporation of Delaware
No Drawing. Filed Nov. 14, 1968, Ser. No. 775,930
Int. Cl. C07d 5/32, 7/18
U.S. Cl. 260—345.2           4 Claims

ABSTRACT OF THE DISCLOSURE

Halogenated bicyclic ethers are obtained from cycloalkenes. These bicyclic ethers are useful as metalworking or cutting oils.

---

This invention relates to halogenated bicyclic ethers and their production from cycloalkene compounds.

In accordance with this invention novel halogenated bicyclic ether compounds are obtained by reacting a cycoalkene with formaldehyde and a hydrogen halide. Halogenated bicyclic ether compounds produced in accordance with this invention are useful as metalworking or cutting oils.

The production of halogenated bicyclic ethers from cycloalkenes in accordance with this invention is illustrated by the following reaction:

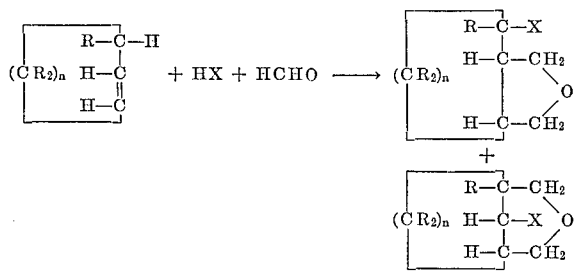

wherein X is a halogen (chlorine, bromine, iodine or fluorine), $n$ is an integer of from 1 to 9 and any one R group is hydrogen or an alkyl group having one to six carbon atoms, the total number of carbon atoms in all of the R groups not to exceed 12.

In the practice of this invention a hydrogen halide such as hydrogen chloride, hydrogen bromide, hydrogen fluoride or hydrogen iodide is reacted with formaldehyde and a cycoalkene. The molar ratio of formaldehyde to the cycloalkene employed is generally in the range from about 0.2:1 to 5:1. Preferably an amount of cycloalkene in excess of one mole per 2 moles of formaldehyde is employed to assure complete reaction of the formaldehyde. The hydrogen halide is generally employed in an amount to correspond to about 0.5 mole per mole of formaldehyde. However, the hydrogen halide can be utilized in excess of this amount to force the reaction to completion.

It is generally preferred that the reaction be carried out in the absence of water. Thus, the formaldehyde can be employed in the form of paraformaldehyde and the other reactants utilized in anhydrous form. The reaction can be advantageously carried out in the presence of a diluent or reaction medium that is substantially non-reactive to the respective reactants under the reaction conditions. Suitable diluents which can be employed in this embodiment of the invention include ethers, saturated hydrocarbons, aromatic hydrocarbons, chlorinated hydrocarbons and the like; representative examples are diethyl ether, methyl ethyl ether, benzene, hexane, toluene, methylene chloride, chloroform, carbon tetrachloride and mixtures thereof.

The reaction can be conducted in an anhydrous non-polar reaction medium or the reaction can be carried out in polar reaction media such as an aqueous reaction medium. In such event, the formaldehyde can be employed in the form of formalin. Again, if desired a non-reactive diluent such as dioxane, tetrahydrofuran, tetrahydropyran, sulfolane and the like can be employed.

In accordance with a preferred embodiment of the invention the halide ion concentration of the liquid reaction medium is increased by the use of a substantially soluble ionizable halogen compound. Any ionizable halogen compound can be employed that is substantially soluble in the reaction medium. For relatively non-polar reaction media preferred ionizable halogen compounds are materials of substantially organic nature which contain an ionic halogen bond. Examples of such compounds include tetramethylammonium chloride, tetramethylammonium bromide, tetramethylammonium fluoride, piperidinium hydrochloride, piperidinium hydrobromide, piperidinium hydrofluoride, piperazinium hydrochloride, quinolinium hydrochloride, 2, 4-lutidinium hydrochloride, 2,3,5 - collidinium hydrobromide, 3,-picolinium hydrochloride, isoquinolinium hydrochloride and the like.

When the reaction is carried out in a relatively polar reaction medium such as an aqueous system relatively polar ionizable halogen compounds can be employed. Examples of such compounds are sodium chloride, potassium chloride, lithium chloride, sodium bromide, potassium bromide, lithium bromide, potassium fluoride, cesium fluoride, rubidium fluoride, magnesium bromide, strontium chloride and the like. In any case, the ionizable halogen compounds which increase the halide ion concentration of the liquid reaction medium are employed in amounts from about 0.1 to about 100 parts by weight for each 100 parts by weight of cycloalkene.

The reaction of the cycloalkene, formaldehyde and hydrogen halide is carried out at a temperature within the range from −150° C. to 250° C. and preferably within the range from −70° C. to 70° C. When the reaction is carried out in a non-aqueous system it is preferable that any liquid water formed during the reaction be removed rapidly. In this case the most preferred temperature range is in the range of −70° C. to 0° C. Under these conditions any water formed as a by-product of the reaction is frozen as it is formed. In the case where an aqueous reaction medium is employed it is most preferred that the temperature employed for the reaction be in the range from about 0° C. to about 100° C. Any convenient pressure either above or below atmospheric can be employed in conducting the reaction. However, the pressure employed should be sufficient to maintain the reaction mixture substantially completely in the liquid phase. The reaction is generally complete within a period from about 1 minute to 10 hours. The reaction can be carried out in a batch or continuous manner. In a batch reaction the hydrogen halide can be passed into a reaction zone containing formaldehyde and the cycloalkene. In a continuous process the reactants can be brought together simultaneously for a period sufficient to result in the desired degree of conversion before subsequent isolation and recovery steps. If desired, the reaction can be carried out in the presence of an inert gas such as nitrogen or helium.

Also, if desired, the reaction can be promoted by the use of catalytic amounts of a Lewis acid catalyst such as stannic chloride, zinc chloride, boron trifluoride and the like. Likewise, minor amounts of dehydrating agents such as magnesium sulfate, sodium sulfate, phosphorous trichloride, phosphorous pentoxide and the like can be present in the reaction medium when non-aqueous or anhydrous systems are utilized. However, the catalytic promotors or dehydrating agents are not essential and the process can be carried out satisfactorily without the use of such agents.

The product can be recovered and isolated by conventional procedures. It is generally desirable to remove any excess hydrogen halide from the reaction mixture prior to recovery of the product such as by water washing or by washing the reaction mixture with an aqueous solution of sodium bicarbonate or by purging the reaction zone with a non-reactive gas. The resulting reaction mixture can then be distilled or separated by conventional separation procedures.

The following examples illustrate the present invention.

EXAMPLE 1

A stirred reactor was charged with 135 grams (4.5 moles) of paraformaldehyde, 174 grams (3.0 moles) of cyclopentene, and 500 milliliters of methylene chloride. At a temperature of about −65° C. hydrogen chloride was introduced into the mixture for about three hours. Isolation of the product by distillation gave 108.9 grams of product comprised largely of a mixture of 8-chloro-3-oxabicyclo[3.2.1]octane and 8 - chloro - 3 - oxabicyclo [3.3.0]octane having a boiling point of 97–101° C. (35 to 1.5 millimeters of mercury) and having infrared characteristics indicative of a cyclic compound. This product was refractionated to give a center fraction having a boiling point of 84–86° C. (15 millimeters of mercury) which was found to have the following elemental composition: C, 56.9; H, 7.5; Cl, 24.1. Elemental composition calculated for 8-chloro-3-oxabicyclo[3.2.1]octane and 8-chloro-3-oxabicyclo[3.3.0]octane ($C_7H_{11}ClO$) is: C, 57.4; H, 7.5; Cl, 24.3.

A total of 50 grams of the above product of halogenated bicyclic ethers having a boiling point in the range of 97–101° C. was charged to a stirred reactor. Also charged were 300 milliliters of methanol. Then a total of 46 grams (2.0 gram atoms) of sodium was added in small pieces. The reaction mixture was then poured into water and extracted into ether. The ether was dried with magnesium sulfate, filtered, and the ether was stripped. Distillation of the residue gave 23.1 grams of a colorless liquid having a boiling point of 62–64° C. (47 millimeters of mercury) which was determined by gas liquid chromatography to be comprised of two compounds in a proportion of 1:2. The respective isomers of the composition were separated by preparatory gas chromatography, characterized, and identified by nuclear magnetic resonance as follows:

The minor component, a solid having a melting point of 109–110° C. was identified as 3-oxabicyclo[3.2.1] octane. Elemental composition calculated for $C_7H_{12}O$ (3-oxabicyclo[3.2.1]octane) was C, 75.0; H, 10.7. Elemental composition of the minor component was determined experimentally to be: C, 74.8; H, 10.6. The nuclear magnetic resonance spectrum showed a 4:2:6 proton distribution with a singlet at 6.55 tau (4 protons in the region for methylene groups adjacent to oxygen in a 6- or 7-membered ring. The pattern is a singlet because in each —CH$_2$— group the nuclei are equivalent and are equally coupled to the neighboring proton. A broad resonance at 8.03 tau (2 protons) is in the region of —CH beta to —O— in a 6-membered ring, and the other 6 protons, which are due to cyclic methylene, overlap between 8.1 and 8.7 tau and cannot be resolved.

These data demonstrate the minor component to be 3-oxabicyclo[3.2.1]octane which was derived from 8-chloro-3-oxabicyclo[3.2.1]octane by the above described sodium and methanol reduction.

The major component, a liquid, was identified as cis-3-oxabicyclo[3.3.0]octane. Elemental composition calculated for $C_7H_{12}O$, cis-3-oxabicyclo[3.3.0]octane, was: C, 75.0; H, 10.7. Elemental composition determined for the said liquid was: C, 74.9; H, 10.9. The nuclear magnetic resonance spectrum showed a complex resonance between 6.1 and 6.8 tau (measuring 4 protons) with the characteristic appearance of methylene groups adjacent to oxygen in tetrahydrofurans. The complexity is caused by magnetic non-equivalence of the methylene protons, and indicates a rigid ring system. A broad band between 7.1 and 7.8 tau (2 protons) is assigned to the hydrogens on the bridge carbons. They are about 25 cycles per second downfield from the expected position of —CH$_2$ beta to —O— in a 5-membered ring. However, the resolved structure in the spectrum of this sample is indicative of a rigid carbon skeleton having cis- and trans-conformational states. The broad resonance between 8.0 and 8.75 tau due to the cyclic methylene groups measures 6 protons.

The above data demonstrate that the major component is cis-3-oxabicyclo[3.3.0]octane which was derived by sodium and methanol reduction from 8-chloro-3-bicyclo [3.3.0]octane.

EXAMPLE 2

Synthesis of 9-chloro-3-oxabicyclo[3.3.1]nonane and 2-chloro-8-oxabicyclo[4.3.0]nonane A stirred reactor was charged with 135 grams (4.5 moles) of paraformaldehyde and 246 grams (3.0 moles) of cyclohexene. At a temperature of −65° C. hydrogen chloride was passed through the reactor for 4 hours. A total of 201.7 grams (65.5% crude yield) of the product comprised largely of 9-chloro-3-oxabicyclo[3.3.1]nonane and 2-chloro-8-oxabicyclo[4.3.0]nonane was recovered by distillation, boiling point 88–135° C. (17 millimeters of mercury). Refractionation of this product gave 121.5 grams of a product having a boiling point of 90–96° C. (11 millimeters of mercury), which partly solidified. A portion of this semi-solid material was recrystallized from methanol to give a crystalline solid, melting point 112–116° C., which was comprised of two isomeric compounds as characterized by gas liquid chromatography. This product was found to have the following elemental composition: C, 59.8; H, 8.3. Elemental composition calculated for 9-chloro-3-oxabicyclo[3.3.1]nonane and 2-chloro-8-oxabicyclo[4.3.0]nonane, $C_8H_{12}OCl$ is: C, 59.8; H, 8.1. The mixture of halogenated bicyclic ethers was comprised of about 65 mole percent of 9-chloro-3-oxabicyclo [3.3.1]nonane and 35 mole percent 2-chloro-8-oxabicyclo [4.3.0]nonane.

A stirred reactor was charged with 16.1 grams (0.1 mole) of the above solid isomer mixture and 100 milliliters of methanol. To this mixture was added 11.5 grams (0.5 gram atoms) of sodium as in Example 1. After dilution with water and extraction into ether, the resultant ether solution was dried with magnesium sulfate and the solvent was stripped. The crystalline residue (10.6 grams, melting point 120–122° C.) was determined by gas liquid chromatography to be of purity greater than 95%. The nuclear magnetic resonance spectrum was in agreement with the assigned structure of 3-oxabicyclo[3.3.1]nonane. A high resolution mass spectrum confirmed the composition $C_8H_{14}O$ (theoretical mass, 126.1448; measured mass 126.1466).

EXAMPLE 3

A mixture of halogenated bicyclic ethers comprised of about 65 mole percent of 9-chloro-3-oxabicyclo[3.3.1] nonane and about 35 mole percent of 2-chloro-8-oxabicyclo[4.3.0]nonane were applied to a die used to cut threads on stainless steel pipe and functioned as a cutting oil.

In a manner similar to Examples 1 and 2, cycloalkenes having from 4 to 12 carbon atoms in the ring, i.e. cyclobutene ($n=1$) through cyclododecene ($n=9$), with or without an alkyl substituent on one or more of the methylene groups, can be employed to produce halogenated bicyclic alkane ethers. Thus, cyclobutene can be reacted with formaldehyde and a hydrogen halide to produce a mixture of 7-halo-3-oxabicyclo[3.1.1]heptane and 7-halo-3-oxabicyclo[3.2.0]heptane. Similarly, cyclooctene gives 11-halo-9-oxabicyclo[5.3.1]undecane and 2-halo-10-oxabicyclo[6.3.0]undecane. Cyclododecene gives 15-halo-13-oxabicyclo[9.3.1]pentadecane and 2-halo-14-oxabicyclo[10.3.0]pentadecane. 3-Ethylcyclohexene gives 1-ethyl-9-halo-3-oxabicyclo[3.3.1]nonane, 5-ethyl-2-halo-8-oxabicyclo[4.3.0]nonane, 6-ethyl-9-halo-3-oxabicyclo[3.3.1]nonane, and 2-ethyl-2-halo-8-oxabicyclo[4.3.0]nonane. 4,6-Dimethylcyclooctene gives 3,5-dimethyl-11-halo-9-oxabicyclo[5.3.1]undecane, 2,4-dimethyl-11-halo-9-oxabicyclo[5.3.1]undecane, 4,6-dimethyl-2-halo-10-oxabicyclo[6.3.0]undecane, and 3,5-dimethyl-2-halo-10-oxabicyclo[6.3.0]undecane.

Those modifications and equivalents which fall within the spirit of the invention and the scope of the appended claims are to be considered part of the invention.

I claim:

1. A process of producing halogenated bicyclic ethers which comprises reacting a cycloalkene compound with formaldehyde and a hydrogen halide and recovering a halogenated bicyclic ether from the reaction product.

2. The process of claim 1 conducted in a substantially non-aqueous reaction medium.

3. A compound selected from the group of compounds having the formulae:

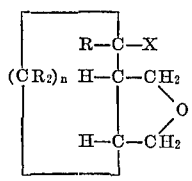

and

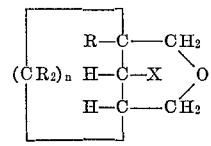

wherein X is a halogen, $n$ is an integer of from 1 to 9 and R at any indicated position is hydrogen or alkyl having one to six carbon atoms and wherein the total number of carbon atoms in all of the R groups does not exceed 12.

4. A compound selected from the group consisting of 8-chloro-3-oxabicyclo[3.2.1]octane, 8-chloro-3-oxabicyclo[3.3.0]octane, 9-chloro-3-oxabicyclo[3.3.1]nonane, and 2-chloro-8-oxabicyclo[4.3.0]nonane.

References Cited

UNITED STATES PATENTS 3,000,781  9/1961  Feichtinger et al.
260—346.2 XR

HENRY R. JILES, Primary Examiner

J. N. FORD, Assistant Examiner

U.S. Cl. X.R.

252—54; 260—346.2